United States Patent [19]

Imai

[11] Patent Number: 5,504,934
[45] Date of Patent: Apr. 2, 1996

[54] SATELLITE COMMUNICATION RECEIVING DEVICE CAPABLE OF AUTOMATICALLY DEALING WITH FREQUENT CHANGE OF AN ASSIGNED CHANNEL

[75] Inventor: Naoki Imai, Tokyo, Japan

[73] Assignee: NEC Corporation, Tokyo, Japan

[21] Appl. No.: 266,577

[22] Filed: Jun. 28, 1994

[30] Foreign Application Priority Data

Jun. 29, 1993 [JP] Japan .................................. 5-158945

[51] Int. Cl.⁶ .................................................. H04N 7/20
[52] U.S. Cl. .......................... 455/3.2; 455/12.1; 380/20
[58] Field of Search ........................ 455/3.2, 140, 11.1, 455/725, 12.1, 13.1, 31.1, 32.1, 54.1; 380/20, 21; 340/825.06, 825.07; 370/58.2, 73

[56] References Cited

U.S. PATENT DOCUMENTS

| 4,709,266 | 11/1987 | Hanas et al. | 455/12.1 |
| 4,995,096 | 2/1991 | Isoe | 455/12.1 |

Primary Examiner—David E. Harvey
Attorney, Agent, or Firm—Sughrue, Mion, Zinn, Macpeak & Seas

[57] ABSTRACT

In a satellite communication receiving device which is for use in a network having a network number and comprises a tuner section (24) for receiving a first communication signal as a received signal from an assigned channel assigned at a time to the network, a first extracting circuit (29) extracts, as extracted common information from the received signal, common information including the network number. A processing circuit (30) processes the extracted common information into a processed signal. When the assigned channel is changed due to a change of a borrowing transponder of a satellite, the processing circuit does not receive the extracted common information from the first extracting circuit and produces a reception impossibility signal. In response to the impossibility signal, a channel selecting circuit (25) causes the tuner section to receive a second communication signal from a specific channel with channel information included in the second communication signal during a contracted time band of the network. The channel information comprises a pair of the network number of the network and a channel number of the assigned channel which is currently assigned to the network. A second extracting circuit (33) extracts, as extracted channel information from the received signal, the channel information comprising the network number of the network. In this event, the channel selecting circuit causes the tuner section to receive another communication signal from another channel which has the channel number included in the extracted channel information.

3 Claims, 4 Drawing Sheets

SATELLITE COMMUNICATION RECEIVING DEVICE CAPABLE OF AUTOMATICALLY DEALING WITH FREQUENT CHANGE OF AN ASSIGNED CHANNEL

BACKGROUND OF THE INVENTION

This invention relates to a satellite communication receiving device for use in a receiving station of a first-type network of a satellite communication system, A satellite communication system comprises a first-type network and a second-type network. The second-type network comprises a plurality of receiving stations and a transmitting station for transmitting a communication signal to the receiving stations by the use of a specific satellite channel which is fixedly assigned only to the second-type network.

The first-type network comprises a plurality of receiving stations and a transmitting station for transmitting a communication signal to the receiving stations by the use of an assigned channel which is assigned at a time to the first-type network among satellite channels. In order to carry out communication in the first-type network, it is necessary for the transmitting station to contract with a satellite management company for time-borrowing of a transponder of a communication satellite. Inasmuch as other first-type networks also make use of the satellite communication system, an assigned transponder is unavoidably changed whenever the borrowing is carried out. This results in frequent change of the assigned channel. It is therefore necessary to deal with the change of the assigned channel in a satellite communication receiving device of each of the receiving stations of the first-type network.

Conventionally, an operator of each of the receiving stations knows by accepting information of the change of the assigned channel from the transmitting station through a telephone line and carries out a channel tuning operation of a tuner of the satellite communication receiving device of the receiving station. It is impossible to automatically deal with the change of the assigned channel in the satellite communication receiving device. In addition, the information of the change of the assigned channel should be frequently transmitted from the transmitting station to the receiving station through the telephone line. Such informing operation is very troublesome and time-consuming as an increase of the number of the receiving stations included in the first-type network.

SUMMARY OF THE INVENTION

It is therefore an object of this invention to provide a satellite communication receiving device which can automatically deal with the change of an assigned channel.

It is another object of this invention to provide a satellite communication receiving device of the type described, which makes it unnecessary to inform a change of an assigned channel from a transmitting station to a receiving station.

Other objects of this invention will become clear as the description proceeds.

A satellite communication receiving device to which this invention is applicable is for use in a first receiving station of a first-type network of a satellite communication system which comprises a second-type network and which makes use of a predetermined number of satellite channels and a specific satellite channel. The first-type network comprises a first transmitting station for transmitting a first communication signal to the first receiving station by the use of an assigned channel which is assigned at a time to the first-type network among the predetermined number of satellite channels. The second-type network comprises a second receiving station and a second transmitting station for transmitting a second communication signal to the second receiving station by the use of the specific satellite channel which is fixedly assigned at all times to the second-type network. The first-type network and the second-type network have network numbers which are different from each other. The first communication signal comprises common information comprising the network number of the first-type network. The second communication signal comprises common information comprising the network number of the second-type network.

According to this invention, the second communication signal is transmitted by the second transmitting station by the use of the specific satellite channel with channel information included in the second communication signal during a contracted time band of the first-type network. The channel information comprises a pair of the network number of the first-type network and a channel number of the assigned channel which is currently assigned to the first-type network. The satellite communication receiving device comprises: a network number memory for memorizing the network number of the first-type network as a memorized network number; selective receiving means supplied with a channel specifying signal specifying one of the predetermined number of satellite channels and the specific satellite channel as a specified channel, the selective receiving means selectively receiving one of the first and the second communication signals as a received communication signal from the specified channel; first extracting means connected to the network number memory and the selective receiving means for extracting, as extracted common information from the received communication signal, the common information comprising the network number coincident with the memorized network number; processing means connected to the first extracting means for processing the extracted common information into a processed signal and for producing a reception impossibility signal when the processing means does not receive the extracted common information; channel specifying signal producing means for producing, in response to the reception impossibility signal, the channel specifying signal which specifies the specific satellite channel as the specified channel; and second extracting means connected to the network number memory and the selective receiving means for extracting, as extracted channel information from the received communication signal, the channel information comprising the network number coincident with the memorized network number to produce the channel number of the extracted channel information as an extracted channel number. The channel specifying signal producing means produces, in response to the extracted channel number, the channel specifying signal which specifies, as the specified channel, one of the predetermined number of satellite channels that has the extracted channel number.

DESCRIPTION OF THE PREFERRED EMBODIMENT

Figure 1:
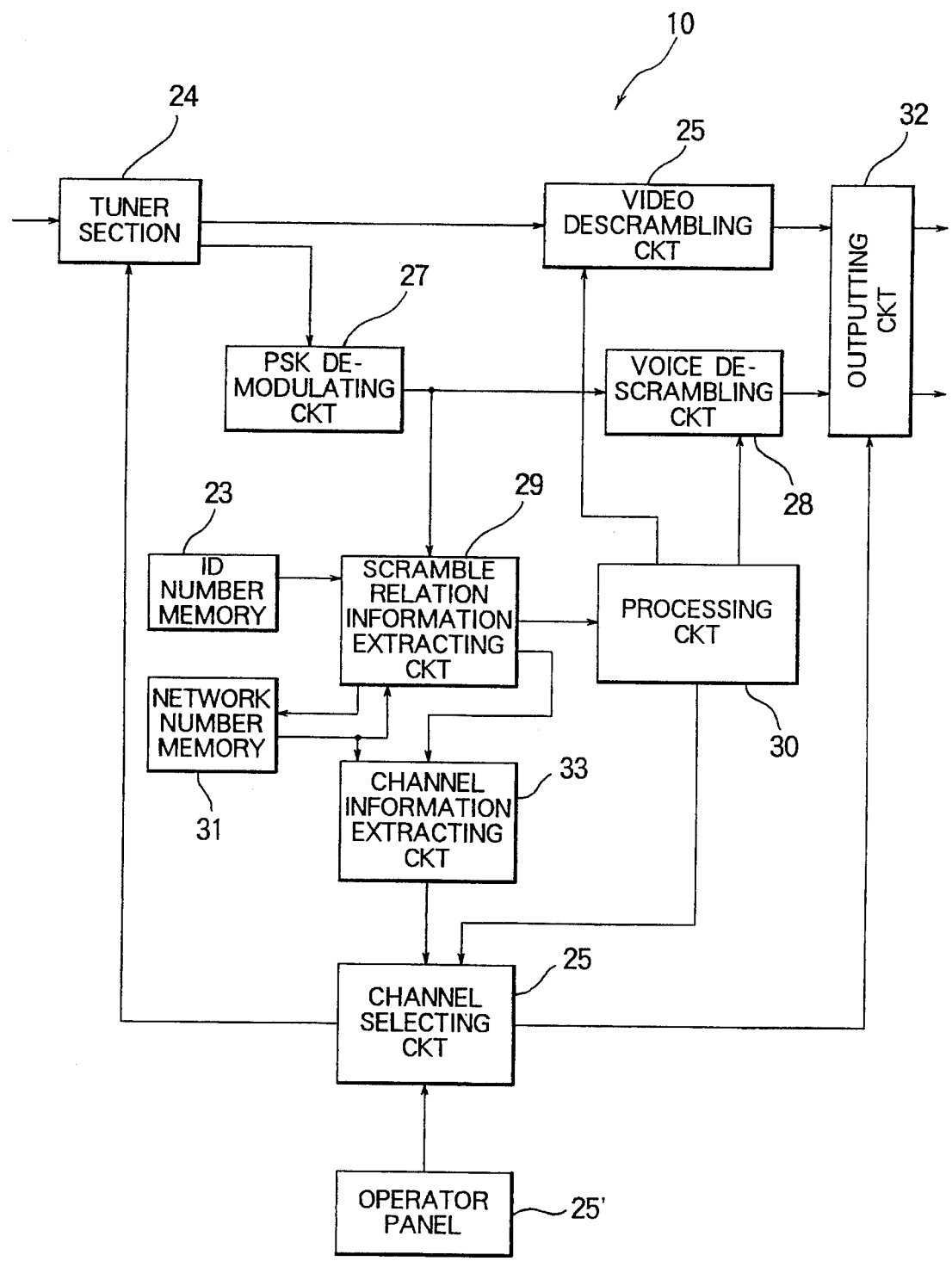
FIG. 1 is a block diagram of a satellite communication receiving device according to an embodiment of this invention.
Figure 2:
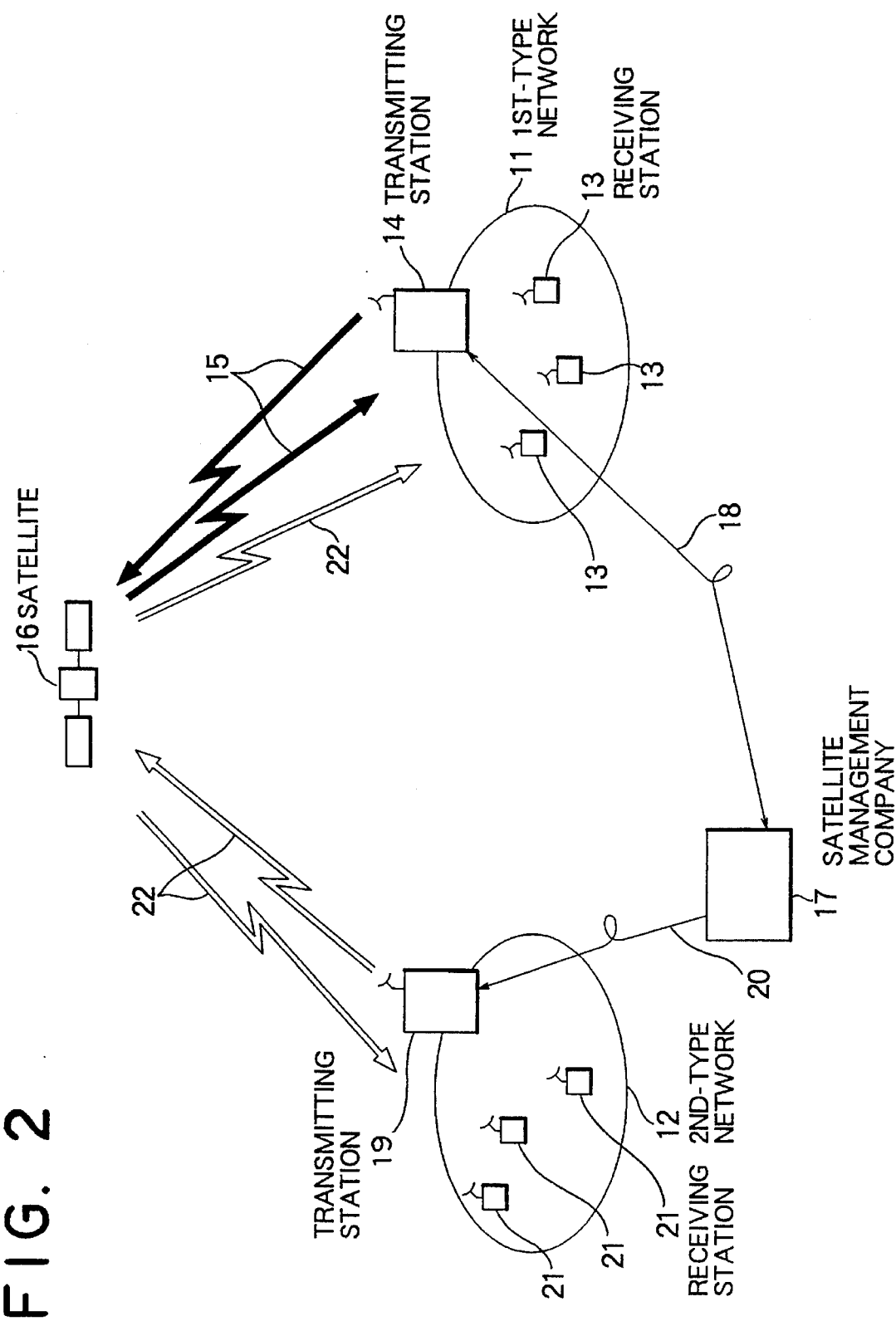
FIG. 2 is a diagram of a satellite communication system including a first-type network comprising receiving stations, each having the satellite communication receiving device illustrated in FIG. 1.

Referring to FIG. 1, a satellite communication receiving device 10 according to a preferred embodiment of this invention is used in a satellite communication system illustrated in FIG. 2.

In FIG. 2, the satellite communication system comprises first-type and second-type networks 11 and 12. Although a single first-type network 11 and a single second-type network 12 are included in the illustrated satellite communication system, a plurality of the first-type networks and a plurality of the second-type networks may be included in the satellite communication system. The illustrated satellite communication system makes use of a predetermined number of satellite channels and other satellite channels.

The first-type network 11 comprises a plurality of first receiving stations 13 and a first transmitting station 14 which transmits a first communication signal 15 to the first receiving stations 13 through a communication satellite 16. In this event, the first transmitting station 14 transmits the first communication signal 15 to the first receiving stations 13 by the use of an assigned channel which is assigned at a time to the first-type network 11 among the predetermined number of satellite channels.

More specifically, such communication is carried out in the first-type network 11 during a contracted time band by the use of the assigned channel. A satellite management company 17 manages a transponder of the communication satellite 16 and decides the contracted time band and the assigned channel for each communication in response to a request for time-borrowing of the transponder. The request is carried out by the first transmitting station 14 of the first-type network 11 by the use of, for example, a telephone line 18. The satellite management company 17 informs the contracted time band and the assigned channel to the first transmitting station 14 by the use of, for example, the telephone line 18 so that the first transmitting station 14 can transmit the first communication signal 15.

The satellite management company 17 furthermore informs a lending state of the transponder to a second transmitting station of a selected one of the second-type networks in real time. Description will proceed on the supposition that the selected one of the second-type networks is the illustrated second-type network 12. In this case, the satellite management company 17 informs the lending state of the transponder to a second transmitting station 19 of the second-type network 12 in real time by the use of, for example, another telephone line 20 for the purpose which will become clear as the description proceeds.

The second-type network 12 comprises a plurality of second receiving stations 21. The second transmitting station 19 transmits a second communication signal 22 through the communication satellite 16 by the use of a specific satellite channel of the above-mentioned other satellite channels that is fixedly assigned to the second-type network 12. Other second-type networks are fixedly assigned with remaining ones of the above-mentioned other satellite channels.

The first-type and the second-type networks 11 and 12 and other first-type and second type networks have network numbers, respectively, which are different from each other. The first receiving stations 13 have identification numbers, respectively, which are different from one another. The second receiving stations 21 have other identification numbers, respectively, which are different from one another and which are different from the identification numbers of the first receiving stations 13.

Turning back to FIG. 1 with reference to FIG. 2 continued, the satellite communication receiving device 10 is for use in each of the first receiving stations 13 of the first-type network 11 and comprises an identification (ID) number memory 23 which preliminarily memorizes the identification number of the first receiving station 13 under consideration as a memorized identification number.

A tuner section 24 is supplied with a channel specifying signal from a channel selecting circuit 25 which serves as a channel specifying signal producing circuit. The channel specifying signal specifies one of the predetermined number of satellite channels and the specific satellite channel as a specified channel. It is to be noted here that initial channel specifying operation is manually carried out by the use of an operator panel 25' in an initial state of the satellite communication receiving device 10 so that the channel selecting circuit 25 produces the specifying signal specifying the assigned channel which the satellite management company 17 informs to the first transmitting station 14 through the telephone line 18 and which the first transmitting station 14 thereafter informs to the first receiving station 13 under consideration through another telephone line (not shown). In the initial state of the satellite communication receiving device 10, the tuner section 24 receives the first communication signal 15. Generally speaking, the tuner section 24 selectively receives one of the first and the second communication signals 15 and 22 as a received communication signal through an antenna (not shown) from the specified channel. Description will be made as regards a case where each of the first and the second communication signals 15 and 22 is a BS (broadcasting satellite) format signal. The tuner section 24 demodulates the received communication signal (frequency modulated signal) into a scrambled video signal and a voice subcarrier signal (phase shift keying (PSK) signal). The scrambled video signal is supplied to a video descrambling circuit 26. The voice subcarrier signal is supplied to a PSK demodulating circuit 27. The PSK demodulating circuit 27 demodulates the voice subcarrier signal into a demodulated data stream signal comprising scrambled voice data. The demodulated data stream signal is supplied to a voice descrambling circuit 28 and to a scramble relation information extracting circuit 29 which is referred to as a first extracting circuit.

Figure 3:
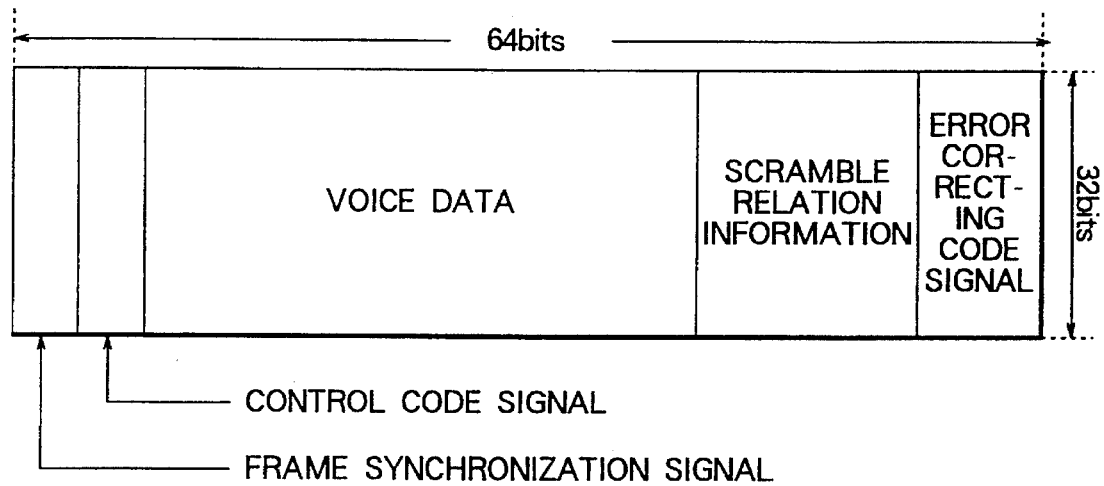
FIG. 3 shows a signal format of an output signal of a PSK demodulating circuit of the satellite communication receiving device illustrated in FIG. 1.

Turning to FIG. 3, the demodulated data stream signal comprises successive frames, each of which comprises a frame synchronization signal, a control code signal, scrambled voice data, scramble relation information, and an error correcting code signal given by BCH (Base-Chaudhuri-Hocquenghem) codes. The illustrated frame comprises (64×32) bits.

Figure 4:
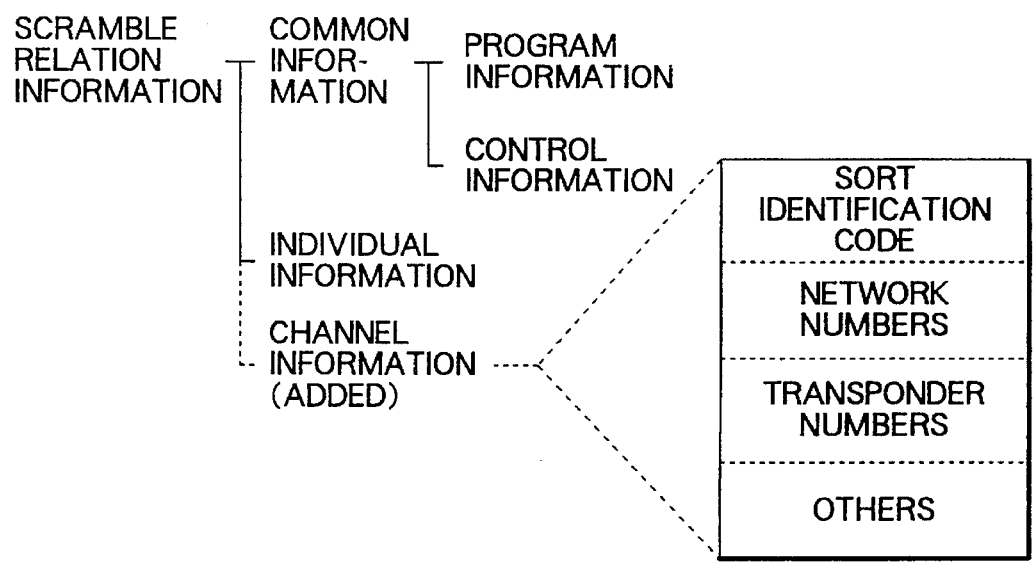
FIG. 4 is a view of scramble relation information for use in describing operation of the satellite communication receiving device illustrated in FIG. 1.

Turning to FIG. 4, the scramble relation information obtained from the first communication signal 15 (FIG. 2) is classified into individual information for the first receiving stations 13 (FIG. 2) and common information for the first receiving stations 13. The individual information comprises the identification numbers of the respective first receiving stations 13 of the first-type network 11 (FIG. 2) and contract conditions of the respective first receiving stations 13 of the first-type network 11. According to this invention, the individual information is made only on the initial state of the satellite communication receiving device 10 to further comprise the network number of the first-type network 11 in correspondence to each of the identification numbers of the first receiving stations 13 of the first-type network 11. The common information is common in all of the first receiving stations 13 of the first-type network 11 and is classified into program information and control information. The program information includes scramble removing data.

On the other hand, the scramble relation information obtained from the second communication signal 22 (FIG. 2) is classified into individual information for the second receiving stations 21 (FIG. 2) and common information for the second receiving stations 21. The individual information comprises the identification numbers of the respective second receiving stations 21 of the second-type network 12 (FIG. 2) and contract conditions of the respective second receiving stations 21 of the second-type network 12. The common information is common in all of the second receiving stations 21 of the second-type network 12 and is classified into program information and control information. The program information includes scramble data. According to this invention, the scramble relation information produced by the second transmitting station 19 (FIG. 2) is classified into the individual information, the common information, and channel information. The channel information comprises a sort identification code representative of the channel information, the network numbers of the first-type networks under communication, and transponder numbers (or channel numbers) of the transponders which are currently used in the first-type networks under communication, respectively. The channel information is produced by the second transmitting station 19 in real time on the basis of the lending state of the transponders that is obtained from the satellite management company 17 (FIG. 2). The channel information is transmitted by the second transmitting station 19 at all times by the use of the specific satellite channel with the channel information included in the scramble relation information of the second communication signal.

In FIGS. 1 and 2, the scramble relation information extracting circuit 29 is supplied with the memorized identification number from the identification number memory 23 and extracts, as extracted scramble relation information from the demodulated data stream signal, the scramble relation information comprising the individual information including the identification number which coincides with the memorized identification number. When the extracted scramble relation information is extracted, the scramble information extracting circuit 29 supplies a network number memory 31 with the network number included in the individual information of the extracted scramble relation information. The network number memory 31 memorizes the network number as a memorized network number. Thereafter, the scramble information extracting circuit 29 supplies a processing circuit 30 with the common information which corresponds to the memorized network number. The processing circuit 30 processes the scramble removing data of the program information of the common information into a scramble removing signal for the video descrambling circuit 26 and another scramble removing signal for the voice descrambling circuit 28. The scramble removing signals are collectively referred to as a processed signal. In response to the scramble removing signal, the video descrambling circuit 26 descrambles the scrambled video signal into a descrambled video signal. Likewise, the voice descrambling circuit 28 descrambles the scrambled voice data of the demodulated data stream signal into a descrambled voice signal in response to the scramble removing signal.

Figure 5:
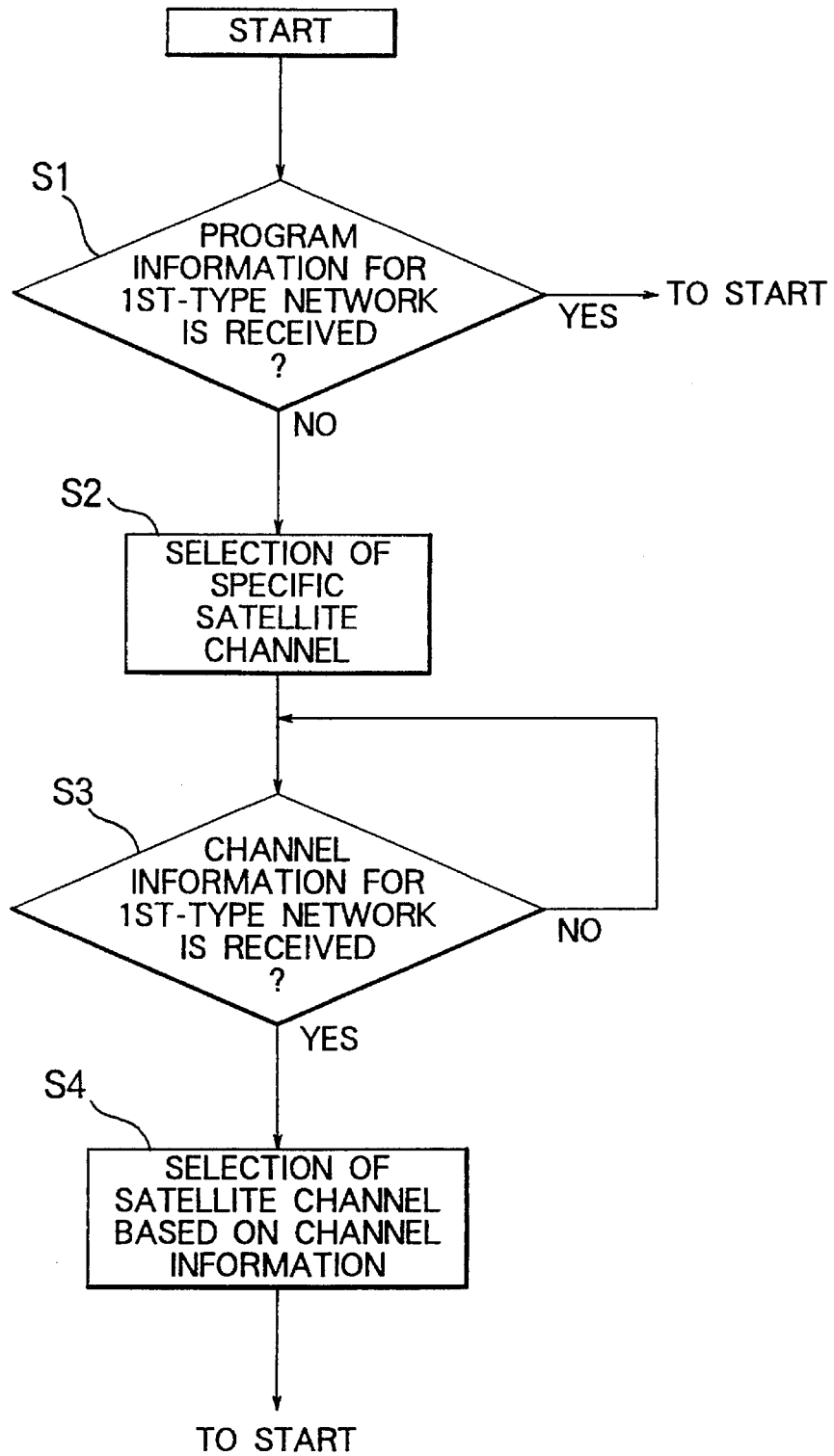
FIG. 5 is a flow chart for use in describing operation of the satellite communication device illustrated in FIG. 1.

Simultaneously, the processing circuit 30 is periodically supplied with the program information of the common information from the scramble relation information extracting circuit 29. When the processing circuit 30 is periodically supplied with the program information, the processing circuit 30 judges that the satellite communication receiving device 10 receives the communication signal for the first-type network 11. In this event, the processing circuit 30 supplies no channel change command to the channel selecting circuit 25. Such judgement is carried out at a first stage S1 illustrated in FIG. 5.

An outputting circuit 32 outputs the descrambled video signal and the descrambled voice signal as they are.

In FIGS. 1 and 2, inasmuch as other first-type networks make use of the satellite communication system, an assigned transponder for the first-type network 11 under consideration is unavoidably changed whenever the time-borrowing of the satellite 16 is carried out as described above. This results in change of the assigned channel which is assigned to the first-type network 11. When the assigned channel is changed, the satellite communication receiving device 10 does not receive the first communication signal for the first-type network 11 under consideration. In this case, the processing circuit 30 does not receive the program information of the common information for the first-type network 11 from the scramble relation information extracting circuit 29. As a result, the processing circuit 30 judges that the satellite communication receiving device 10 does not receive the communication signal for the first-type network 11. In this case, the processing circuit 30 supplies a reception impossibility signal as a channel change command to the channel selecting circuit 25. Such judgement is carried out at the first stage S1 of FIG. 5.

When the channel selecting circuit 25 is supplied with the reception impossibility signal, the channel selecting circuit 25 supplies the tuner section 24 with the channel specifying signal which specifies the specific satellite channel. More specifically, the channel selecting circuit 25 preliminarily memorizes the channel number of the specific satellite channel as a memorized specific channel number. When supplied with the reception impossibility signal, the channel selecting circuit 25 produces the channel specifying signal which specifies the specific satellite channel having the memorized specific channel number. As a consequence, the tuner section 24 selectively receives the second communication signal 22 as the received communication signal. Such selection of the specific satellite channel is carried out at a second stage S2 of FIG. 5. Simultaneously, the channel selecting circuit 25 makes the outputting circuit 32 stop an outputting operation. Alternatively, information produced by a television opaque projector or telop (not shown) is outputted from the outputting circuit 32 in order to inform a person that the communication signal which should be received is absent.

In FIGS. 1 and 2, the tuner section 24 selectively receives the second communication signal when supplied with the channel specifying signal which specifies the specific satellite channel. In this case, the scramble relation information extracting circuit 29 is supplied from the PSK demodulating circuit 27 with the demodulated data stream signal obtained from the second communication signal 22. The scramble relation information extracting circuit 29 extracts, on the basis of the sort identification code (FIG. 4) representative of the channel information, the channel information from the demodulated data stream signal which is obtained from the second communication signal 22. The channel information is supplied to a channel information extracting circuit 33 which is referred to as a second extracting circuit.

The channel information extracting circuit 33 is supplied with the memorized network number representative of the first-type network 11 from the network number memory 31 and extracts, from the channel information, the channel information including the network number which coincides with the memorized network number. When the channel information extracting circuit 33 extracts or finds the channel information including the network number which coincides with the memorized network number, the channel information extracting circuit 33 supplies the channel selecting circuit 25 with the transponder number (or the channel number) corresponding to the network number. Thus, the channel information extracting circuit 33 judges whether or not the satellite communication receiving device 10 receives the channel information for the first-type network 11. Such judgement is carried out at a third stage S3 of FIG. 5.

The channel selecting circuit 25 supplies the tuner section 24 with the channel specifying signal which specifies the satellite channel corresponding to the transponder number (or the channel number) assigned at a time to the first-type network 11. Such selection of the satellite channel is based on the channel information and is carried out at a fourth stage S4 of FIG. 5. The fourth stage S4 is followed by the first stage S1 which is described above.

While this invention has thus far been described in conjunction with a single embodiment thereof, it will readily be possible for those skilled in the art to put this invention into practice in various other manners. For example, in FIG. 1, use may be made, instead of the network number memory 31, of another network number memory which preliminarily memorizes the network number of the first-type network 11 (FIG. 2) as the memorized network number. In this case, it is unnecessary to manually carry out the initial channel specifying operation by the use of the operator panel 25' in the initial state of the satellite communication receiving device 10. It is also unnecessary to transmit, from the first transmitting station 14 (FIG. 2), the first communication signal comprising the individual data which is made only on the initial state to further comprise the network number of the first-type network 11 in correspondence to each of the identification numbers of the first receiving stations 13 (FIG. 2) of the first-type network 11. That is, it is possible to provide the satellite communication receiving device 10 which can automatically select an assigned channel even on the initial state of the satellite communication receiving device 10.

What is claimed is:

1. A satellite communication receiving device for use in a first receiving station of a first-type network of a satellite communication system which comprises a second-type network and which makes use of a predetermined number of satellite channels and a specific satellite channel, said first-type network comprising a first transmitting station for transmitting a first communication signal to said first receiving station by the use of an assigned channel which is assigned at a time to said first-type network among said predetermined number of satellite channels, said second-type network comprising a second receiving station and a second transmitting station for transmitting a second communication signal to said second receiving station by the use of said specific satellite channel which is fixedly assigned at all times to said second-type network, said first-type network and said second-type network having network numbers which are different from each other, said first communication signal comprising common information comprising the network number of the first-type network, said second communication signal comprising common information comprising the network number of said second-type network, wherein:

said second communication signal is transmitted by said second transmitting station by the use of said specific satellite channel with channel information included in said second communication signal during a contracted time band of said first-type network, said channel information comprising a pair of the network number of said first-type network and a channel number of the assigned channel which is currently assigned to said first-type network;

said satellite communication receiving device comprising:

a network number memory for memorizing the network number of said first-type network as a memorized network number;

selective receiving means supplied with a channel specifying signal specifying one of said predetermined number of satellite channels and said specific satellite channel as a specified channel, said selective receiving means selectively receiving one of said first and said second communication signals as a received communication signal from said specified channel;

first extracting means connected to said network number memory and said selective receiving means for extracting, as extracted common information from said received communication signal, the common information comprising the network number coincident with said memorized network number;

processing means connected to said first extracting means for processing said extracted common information into a processed signal and for producing a reception impossibility signal when said processing means does not receive said extracted common information;

channel specifying signal producing means for producing, in response to said reception impossibility signal, the channel specifying signal which specifies said specific satellite channel as said specified channel; and second extracting means connected to said network number memory and said selective receiving means for extracting, as extracted channel information from said received communication signal, the channel information comprising the network number coincident with said memorized network number to produce the channel number of said extracted channel information as an extracted channel number;

said channel specifying signal producing means producing, in response to said extracted channel number, the channel specifying signal which specifies, as said specified channel, one of said predetermined number of satellite channels that has said extracted channel number.

2. A satellite communication receiving device as claimed in claim 1, said first and said second receiving stations having identification numbers which are different from each other, wherein:

said first communication signal is transmitted by said first transmitting station by the use of said assigned channel in an initial state of said satellite communication receiving device with individual information included in said first communication signal, said individual information comprising a pair of the identification number of said first receiving station and the network number of said first-type network;

said satellite communication receiving device further comprising:

an identification number memory for preliminarily memorizing the identification number of said first receiving station as a memorized identification number;

said first extracting means being furthermore connected to said identification number memory for extracting, as extracted individual information from said received communication signal, the individual information comprising the identification number coincident with said memorized identification number to make said network number memory memorize the network number of said extracted individual information as said memorized network number.

3. A satellite communication receiving device as claimed in claim 1, wherein said network number memory preliminarily memorizes the network number of said first-type network as said memorized network number.

* * * * *